United States Patent
Ohmori

(10) Patent No.: US 8,191,006 B2
(45) Date of Patent: May 29, 2012

(54) INFORMATION PROCESSING APPARATUS, CONTROL METHOD OF INFORMATION PROCESSING APPARATUS, COMPUTER PROGRAM AND STORAGE MEDIUM

(75) Inventor: Seiji Ohmori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 12/212,266

(22) Filed: Sep. 17, 2008

(65) Prior Publication Data

US 2009/0077484 A1 Mar. 19, 2009

(30) Foreign Application Priority Data

Sep. 19, 2007 (JP) ................................ 2007-242907
Aug. 26, 2008 (JP) ................................ 2008-217325

(51) Int. Cl.
*G06F 3/048* (2006.01)
(52) U.S. Cl. ...................... 715/771; 348/143; 348/169
(58) Field of Classification Search .................. 715/717, 715/736, 737, 738, 771, 781
See application file for complete search history.

(56) References Cited

U.S. PATENT DOCUMENTS

| | | | |
|---|---|---|---|
| 6,463,343 B1 * | 10/2002 | Emens et al. ................... | 700/83 |
| 6,538,663 B2 * | 3/2003 | Kamei ........................... | 345/635 |
| 6,768,563 B1 * | 7/2004 | Murata et al. ................... | 358/450 |
| 7,310,087 B2 * | 12/2007 | Ha ................................ | 345/169 |
| 7,355,156 B2 * | 4/2008 | Suzuki ........................ | 250/208.1 |
| 7,408,657 B2 * | 8/2008 | Suzuki et al. ................. | 358/1.13 |
| 7,466,357 B2 * | 12/2008 | Myojo ...................... | 348/333.05 |
| 7,948,654 B2 * | 5/2011 | Ozawa et al. ................... | 358/1.9 |
| 2001/0026386 A1 * | 10/2001 | Yamamoto et al. ........... | 359/142 |
| 2002/0030840 A1 * | 3/2002 | Itaki et al. .................... | 358/1.13 |
| 2003/0184647 A1 * | 10/2003 | Yonezawa et al. ............ | 348/143 |
| 2004/0030787 A1 * | 2/2004 | Jandel et al. .................. | 709/229 |
| 2006/0066716 A1 * | 3/2006 | Chang ......................... | 348/14.05 |
| 2006/0193381 A1 * | 8/2006 | Hirose et al. .............. | 375/240.01 |
| 2007/0109575 A1 * | 5/2007 | Salgado et al. .............. | 358/1.13 |
| 2008/0122675 A1 * | 5/2008 | Bilodeau et al. .............. | 341/176 |

FOREIGN PATENT DOCUMENTS

| | | |
|---|---|---|
| EP | 0 729 275 A2 | 8/1996 |
| EP | 729275 A2 * | 8/1996 |
| EP | 0 860 998 A1 | 8/1998 |
| EP | 860998 A1 * | 8/1998 |
| JP | 2003-46994 | 2/2003 |
| JP | 2006-115435 | 4/2006 |

OTHER PUBLICATIONS

Nov. 24, 2010 European Search Report in European Patent Appln. No. 08164608.5.
Oct. 14, 2009 Russian Official Action in Russian Patent Appln. No. 2008137426 (w/ translation).
Windows XP for Beginners/Timerbulatov A.V.—$2^{nd}$ edition, stereotyped—M.: DMK Press; S-Pb.: Peter, 2004.-384 pp. ill., pp. 22-24 (w/ translation).

* cited by examiner

*Primary Examiner* — Tuyetlien Tran
*Assistant Examiner* — Anil Bhargava
(74) *Attorney, Agent, or Firm* — Fitzpatrick, Cella, Harper & Scinto

(57) ABSTRACT

An information processing apparatus that receives data from a plurality of external devices connected via a network and displays an operation window based on a content of the data includes a reception unit that receives a plurality of pieces of data transmitted from the plurality of external devices, an analysis unit that analyzes the received data and identifies a first constituent portion common to the respective data and a second constituent portion not included in the first constituent portion, and a display unit that displays information included in the first constituent portion in a common display area of an operation window, and displays information included in the second constituent portion in an individual display area of the operation window.

30 Claims, 16 Drawing Sheets

FIG. 3

```
<svg viewBox="0 0 640 480"
     xmlns="http://www.w3.org/2000/svg"
     xmlns : xlink="http://www.w3.org/1999/xlink">
  <title id="CameraName">camera001</title>
  <g id="Keys">
    <g id="button_up">
      <rect x="50" y="60" width="30" height="30" fill="none"
        stroke="#0055ff" stroke-width="6"/>
      <text x="54" y="83" font-size="26" font-family="Font01"
        fill="#101040">↑</text>
    </g>
    <g id="button_down">
      <rect x="50" y="160" width="30" height="30" fill="none"
        stroke="#0055ff" stroke-width="6"/>
      <text x="54" y="183" font-size="26" font-family="Font01"
        fill="#101040">↓</text>
    </g>
    <g id="button_left">
      <rect x="20" y="110" width="30" height="30" fill="none"
        stroke="#0055ff" stroke-width="6"/>
      <text x="23" y="134" font-size="26" font-family="Font01"
        fill="#101040">←</text>
    </g>
    <g id="button_right">
      <rect x="80" y="110" width="30" height="30" fill="none"
        stroke="#0055ff" stroke-width="6"/>
      <text x="83" y="134" font-size="26" font-family="Font01"
        fill="#101040">→</text>
    </g>
    <g id="button_zoomin">
      <rect x="20" y="220" width="90" height="30" fill="none"
        stroke="#0055ff" stroke-width="6"/>
      <text x="43" y="244" font-size="26" font-family="Font01"
        fill="#101040">Zoom In</text>
    </g>
    <g id="button_zoomout">
      <rect x="20" y="270" width="90" height="30" fill="none"
        stroke="#0055ff" stroke-width="6"/>
      <text x="43" y="294" font-size="26" font-family="Font01"
        fill="#101040">Zoom Out</text>
    </g>
    <g id="Movie">
      <rect x="140" y="60" width="480" height="320" fill="none"
        stroke="#dd55dd" stroke-width="6"/>
      <video xlink : href="http://192.168.0.10/view.mpg"
        width="480" height="320" x="140" y="60"/>
    </g>
</svg>
```

FIG. 9

```
<svg viewBox="0 0 640 480"
     xmlns="http://www.w3.org/2000/svg"
     xmlns : xlink="http://www.w3.org/1999/xlink">
  <title id="CameraName">camera001</title>
  <g id="Keys">
    <g id="button_up">
      <rect x="50" y="60" width="30" height="30" fill="none"
         stroke="#0055ff" stroke-width="6"/>
      <text x="54" y="83" font-size="26" font-family="Font01"
         fill="#101040">↑</text>
    </g>
    <g id="button_down">
      <rect x="50" y="160" width="30" height="30" fill="none"
         stroke="#0055ff" stroke-width="6"/>
      <text x="54" y="183" font-size="26" font-family="Font01"
         fill="#101040">↓</text>
    </g>
    <g id="button_left">
      <rect x="20" y="110" width="30" height="30" fill="none"
         stroke="#0055ff" stroke-width="6"/>
      <text x="23" y="134" font-size="26" font-family="Font01"
         fill="#101040">←</text>
    </g>
    <g id="button_right">
      <rect x="80" y="110" width="30" height="30" fill="none"
         stroke="#0055ff" stroke-width="6"/>
      <text x="83" y="134" font-size="26" font-family="Font01"
         fill="#101040">→</text>
    </g>
    <g id="Movie">
      <rect x="140" y="60" width="480" height="320" fill="none"
         stroke="#dd55dd" stroke-width="6"/>
      <video xlink : href="http://192.168.0.11/view.mpg"
         width="480" height="320" x="140" y="60"/>
    </g>
</svg>
```

F I G. 11
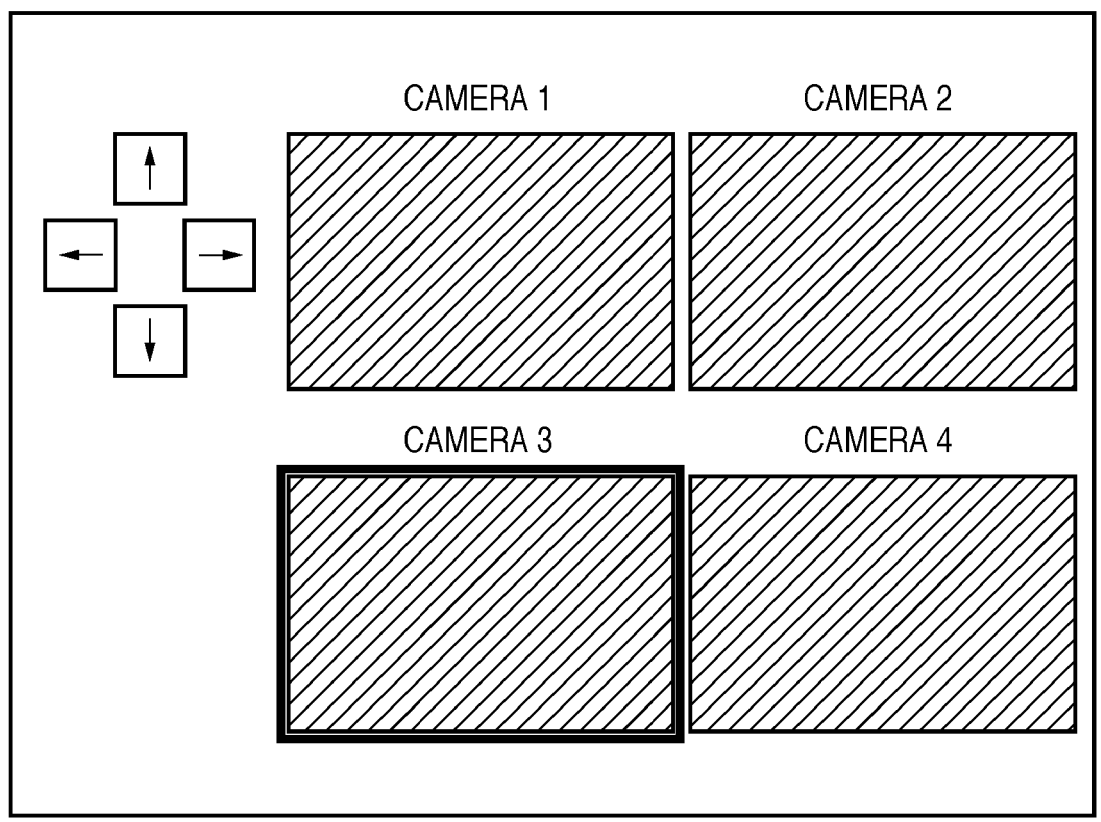

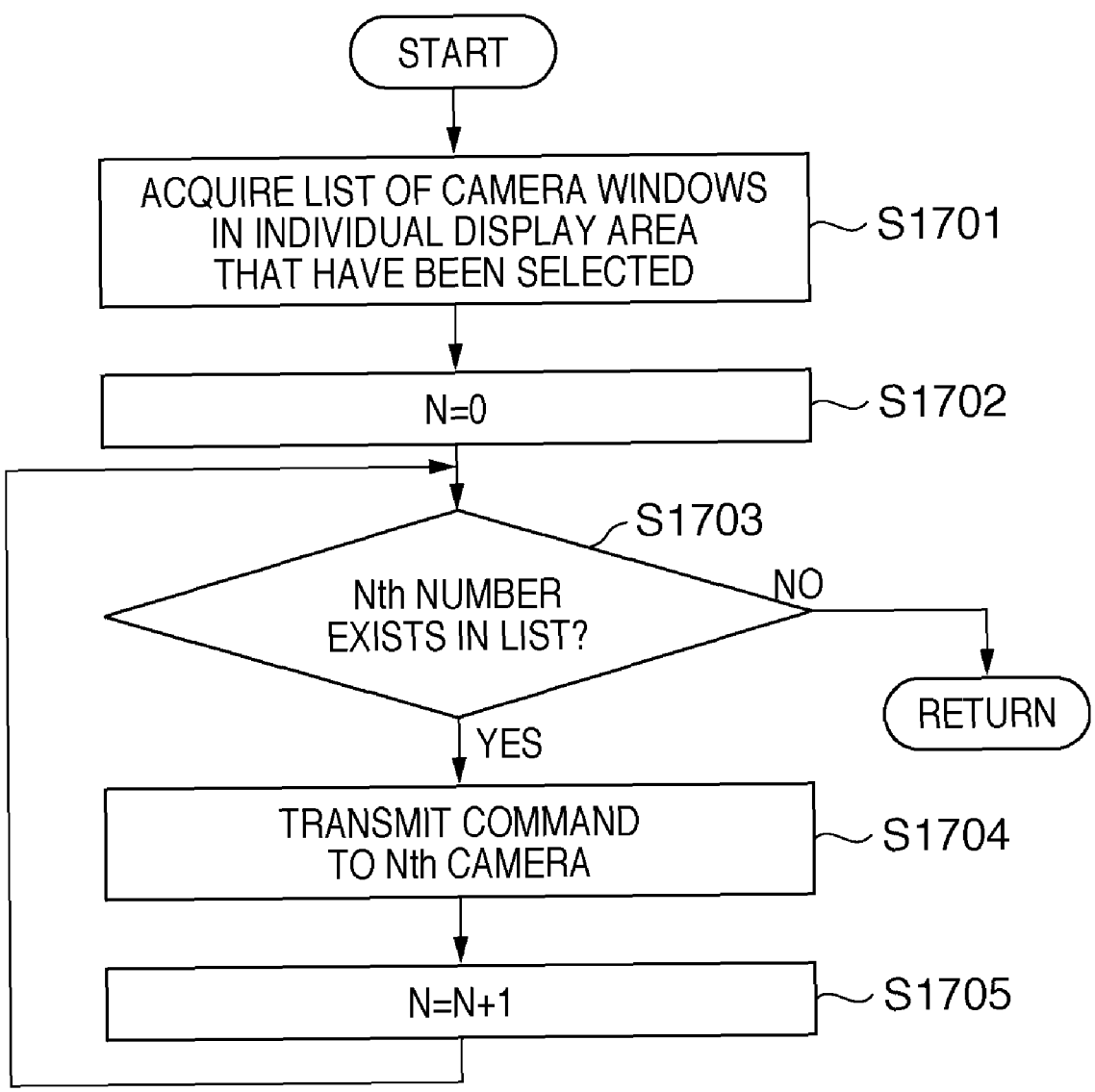

INFORMATION PROCESSING APPARATUS, CONTROL METHOD OF INFORMATION PROCESSING APPARATUS, COMPUTER PROGRAM AND STORAGE MEDIUM

BACKGROUND OF THE INVENTION

1. Field of the Invention

The present invention relates to an information processing technique for processing data received from an external device via a network.

2. Description of the Related Art

Heretofore, there have been systems capable of remotely operating an external device from a personal computer (PC) or the like via a network. For example, in a network camera system used for remote surveillance or the like, a PC and a camera are connected via a network, with the camera being operable from the PC. Generally in a network camera system, images/video, operation button information and the like are transmitted from the camera to the PC, and the received images/video, operation buttons and the like are displayed on a web browser or dedicated application in the PC. Also, information on operations performed on the PC by an operator is sent to the camera, enabling the camera orientation or zoom magnification to be changed.

There are also remote operation systems capable of operating a plurality of external devices from a single device. As for the display configuration on the display unit of a device capable of operating a plurality of external devices, there already exist several methods.

In a first method, an external device selection window such as shown in FIG. 17 is displayed, and once the operator has selected one of a plurality of devices (cameras 1, 2, 3, 4), an operation window of the selected device is displayed. That is, a single window is displayed once the operator has selected one of a plurality of devices (cameras 1, 2, 3, 4) by a certain method.

A second method involves displaying the operation windows of a plurality of external devices simultaneously on a single screen, as shown in FIG. 16. In systems capable of operating an external device from a web browser, for example, operation windows such as in FIG. 16 can be configured by launching a plurality of web browsers in a PC. Such a display can also be realized with dedicated application software.

Systems that operate an external device from a web browser often use a language such as Java® or JavaScript. Security restrictions apply when these languages are used, generally making it impossible to control a plurality of external devices from a single web browser window. Therefore, to perform operations while viewing a plurality of external devices, it is necessary to launch a plurality of web browsers and configure the screen as in FIG. 16.

A third method is a surveillance camera control system in which operation buttons are disposed in one location as buttons common to the external devices, and a plurality of pieces of video received from each of the external devices is displayed (e.g., see Japanese Patent Laid-Open No. 2003-046994).

A problem with the first method, however, is that the operation windows of a plurality of external devices cannot be displayed at one time, and, moreover, this method is operationally cumbersome given that the external device selection window has to be displayed again in order to display the operation window of another external device.

A problem with the aforementioned second method is that while the operation windows of a plurality of devices can be displayed simultaneously, the operation windows of the individual devices are small. In the case where the operation windows of similar devices are displayed simultaneously, plural of the same operation buttons will be displayed on the screen, possibly causing the operator confusion in performing operations. There is also redundancy in processing with regard to plural of the same operation buttons being displayed on the screen. In systems that use a web browser, this method is also operationally cumbersome given that a plurality of web browsers has to be launched.

The aforementioned third method requires a dedicated application that takes prior consideration of the operation buttons of connected external devices. In the case where an external device is replaced, requiring new operation buttons, for example, the dedicated application also needs to be updated, making it impossible to respond flexibly to the functions of external devices.

SUMMARY OF THE INVENTION

In view of this, an object of the present invention is to provide an information processing technique that enables viewing of a plurality of external devices, and is, moreover, capable of displaying individual operation windows as large as possible.

A further object of the present invention is to provide an information processing technique that prevents the same rendering process from being repeated, and enables efficient rendering to be performed.

A still further object of the present invention is to provide an information processing technique capable of responding flexibly to differences in the operation methods of external devices.

According to one aspect of the present invention, there is provided an information processing apparatus that receives data from a plurality of external devices connected via a network, and displays an operation window based on a content of the data, comprising:

a reception unit adapted to receive a plurality of pieces of data transmitted from the plurality of external devices;

an analysis unit adapted to analyze the respective data received by the reception unit, and identify a first constituent portion common to the respective data and a second constituent portion not included in the first constituent portion; and a display unit adapted to display information included in the first constituent portion in a common display area of an operation window, and display information included in the second constituent portion in an individual display area of the operation window.

According to another aspect of the present invention, there is provided a control method of an information processing apparatus that receives data from a plurality of external devices connected via a network, and displays an operation window based on a content of the data, the method comprising:

a reception step of receiving a plurality of pieces of data transmitted from the plurality of external devices;

an analysis step of analyzing the respective data received in the reception step, and identify a first constituent portion common to the respective data and a second constituent portion not included in the first constituent portion; and a display step of displaying information included in the first constituent portion in a common display area of an operation window, and display information included in the second constituent portion in an individual display area of the operation window.

According to the present invention, an information processing technique can be provided that enables viewing of a plurality of external devices, and is, moreover, capable of displaying individual operation windows as large as possible. That is, an information processing technique can be provided that realizes an operator-friendly user interface in a system for displaying the operation windows of a plurality of external devices.

An information processing technique can also be provided that prevents the same rendering process from being repeated, and enables efficient rendering to be performed.

An information processing technique can further be provided that is capable of responding flexibly to differences in the operation methods of external devices.

Further features of the present invention will become apparent from the following description of exemplary embodiments (with reference to the attached drawings).

BRIEF DESCRIPTION OF THE DRAWINGS

FIG. 3 shows an exemplary description of XML data processed by the computer device 201.

FIG. 9 shows an exemplary description of XML data, which differs from FIG. 3, processed by the computer device 201.

FIG. 11 illustrates a state in which XML data received from a plurality of cameras is displayed on the display unit 105 of the computer device 201.

FIG. 19 is a flowchart showing processing performed by the computer device 201.

DESCRIPTION OF THE EMBODIMENTS

Preferred embodiments of the present invention will now be illustratively described in detail, with reference to the drawings. The constituent elements disclosed in these embodiments are, however, merely by way of example, with the technical scope of the present invention being defined by the claims and not being limited by the following individual embodiments.

First Embodiment

In the present embodiment, a computer device will be described as an exemplary structured document processing apparatus (information processing apparatus) according to the present invention. The configuration of the computer device of the present embodiment will be described with reference to the block diagram of FIG. 1.

Figure 1:
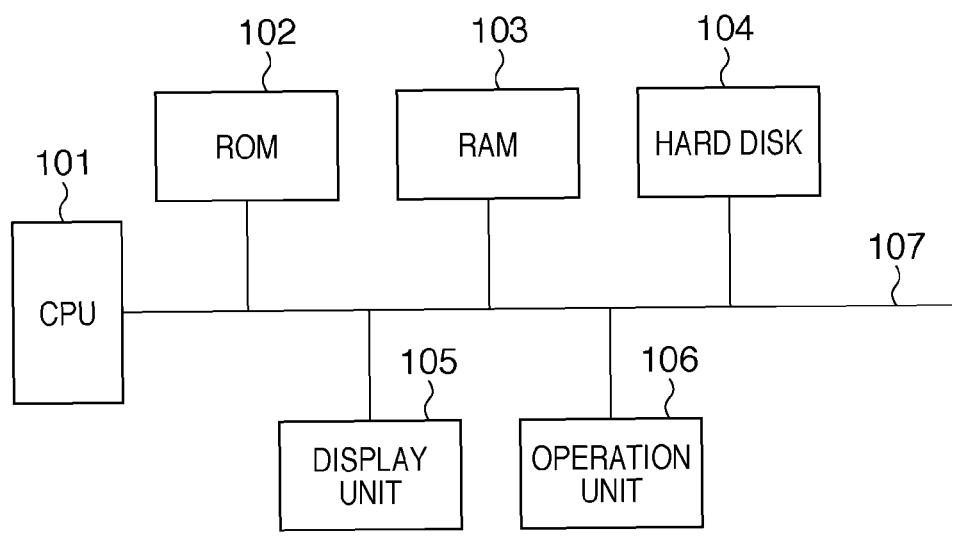
FIG. 1 is a block diagram showing the configuration of a computer device 201 according to embodiments of the present invention.

In FIG. 1, a CPU 101, which functions as a system controller, controls the entire device. A ROM 102 is a read-only memory that stores control programs for the CPU 101 and various fixed data. A RAM 103, which is a rewritable memory constituted by SRAM, DRAM or the like, is for storing program control variables and the like. Various setting parameters, work buffers and the like are also stored in the RAM 103. A hard disk 104 is for storing various files such as XML files. An operation unit 106, which is constituted by a hard keyboard, a pointing device and the like, is for an operator to perform various input operations. A display unit 105 is for notifying the operator with a display using an LCD or the like. Reference numeral 107 denotes a system bus that communicably connects the units 101 to 106.

Figure 2:
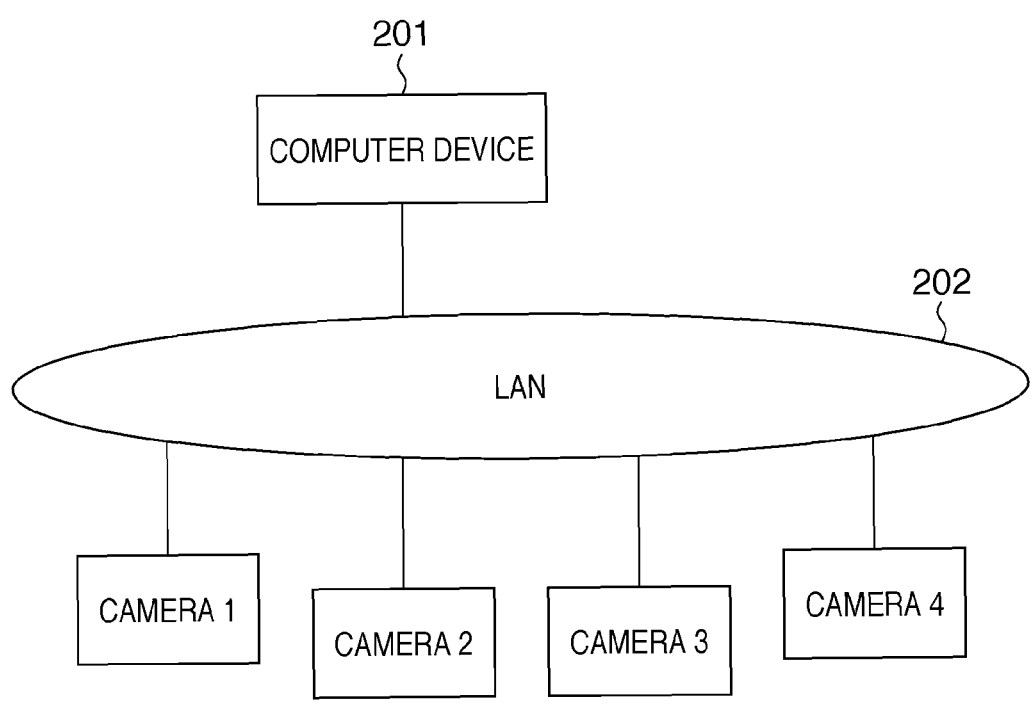
FIG. 2 shows the configuration of a network that includes the computer device 201 according to embodiments of the present invention.

FIG. 2 is a configuration diagram showing an overview of a system that includes the computer device according to the embodiments of the present invention.

In FIG. 2, a computer device 201 and cameras 1, 2, 3 and 4 are connected to a LAN 202, and can communicate with one another. The computer device 201 has a XML data analysis function. In FIG. 2, the devices connected to the LAN 202 are the computer device 201 and four cameras, although other devices may be connected to the LAN 202, and any number of cameras may be connected, without being limited to four.

The computer device 201 according to the embodiments of the present invention can display video (moving images or still images, for example) captured with cameras 1 to 4 connected to the LAN 202 on the display unit 105. The operation of cameras 1 to 4 can also be controlled from the computer device 201.

FIG. 3 shows exemplary XML data transmitted to the computer device 201 from cameras 1, 2, 3 and 4 connected to the LAN 202. The computer device 201 performs processing on the XML data shown in FIG. 3.

As shown in FIG. 3, Scalable Vector Graphics (SVG) data is used in the system of the present embodiment as the XML data transmitted from the cameras to the computer device 201. With the XML data in FIG. 3, the values of id attributes can be used as identification information, for example. The g element whose id attribute has the value "Keys" mainly contains information related to operation buttons, and the g element whose id attribute has the value "Movie" mainly contains information related to captured video. Described in the XML data in FIG. 3 is rendering information for up/down/left/right cursor buttons and zoom in/zoom out buttons as operation buttons. A URL reference for the video information is also described. In the FIG. 3 example, "http://192.168.0.10/view.mpg" is described as the URL reference, with "192.168.0.10" indicating the IP address of the camera, which differs for each camera connected to LAN 202. On the other hand, g elements whose id attribute has the value "Keys", out of the XML data sent from the cameras, are all the same. The CPU 101 of the computer device 201 analyzes the XML data received from the cameras, and displays this information on the display unit 105. The CPU 101 is able to analyze the respective pieces of received data, and identify a constituent portion of data common to the respective data (first constituent portion), and a second constituent portion not included in the first constituent portion.

Figure 4:
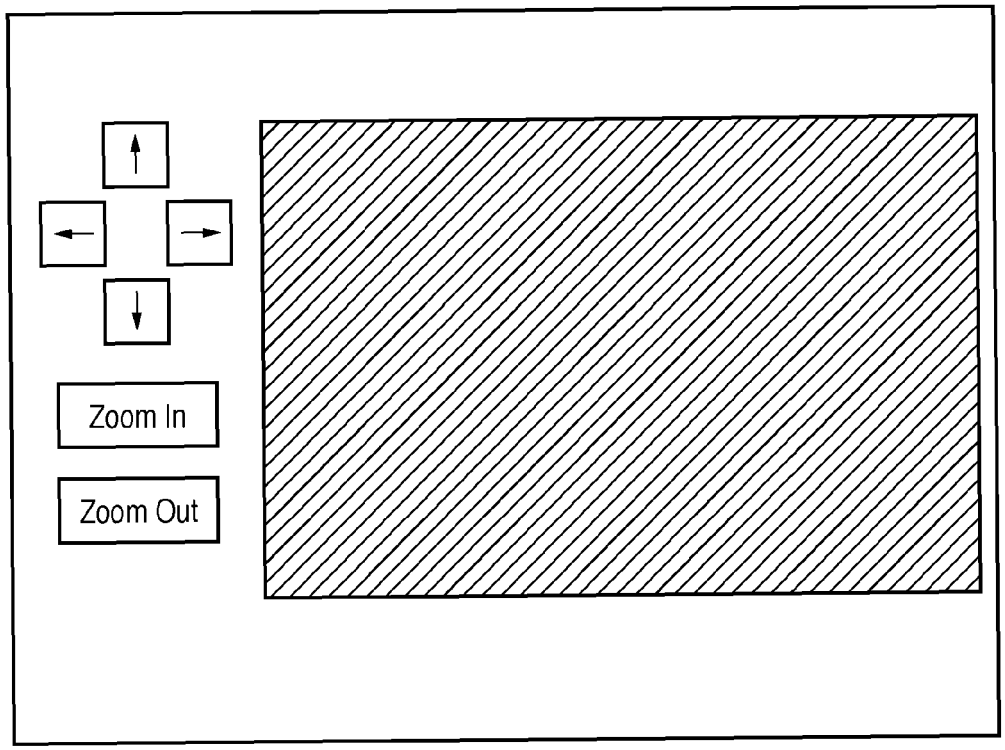
FIG. 4 illustrates a state in which the operation window of an external device is displayed on a display unit 105 of the computer device 201.

FIG. 4 illustrates the display of an operation window on a PC in a network camera system. In this system, it is assumed that data written in HTML is transmitted from a camera to a PC, and that the PC displays the HTML received from the camera using a web browser. As shown in FIG. 4, operation buttons are disposed on the left of the operation window on the PC, and video captured by the camera is displayed on the right side. These operation buttons and the video are included in the HTML, and have been received from the camera by the PC.

When an operator clicks an operation button using a mouse on the window in FIG. 4, this information is transmitted from the PC to the camera, and the camera changes the camera orientation and zoom magnification based on the received operation information.

Apart from network cameras, there are also peripheral devices such as printers and routers whose operations and setting content can be changed from a PC via a network. With these devices also, the operator changes the operations or setting content using a web browser or dedicated application on a PC.

FIG. 4 illustrates a state in which the XML data in FIG. 3 is displayed on the display unit 105 of the computer device 201. In the example shown in FIG. 4, XML data sent from a single camera is displayed. As shown in FIG. 4, the computer device 201 displays the operation buttons on the left of the display unit 105 and video on the right in the case where XML data received from a single camera is displayed. Here, the video captured with the camera is shown with diagonal lines. In this example, the operation buttons include up/down/left/right cursor buttons and zoom in/zoom out buttons.

Figure 5:
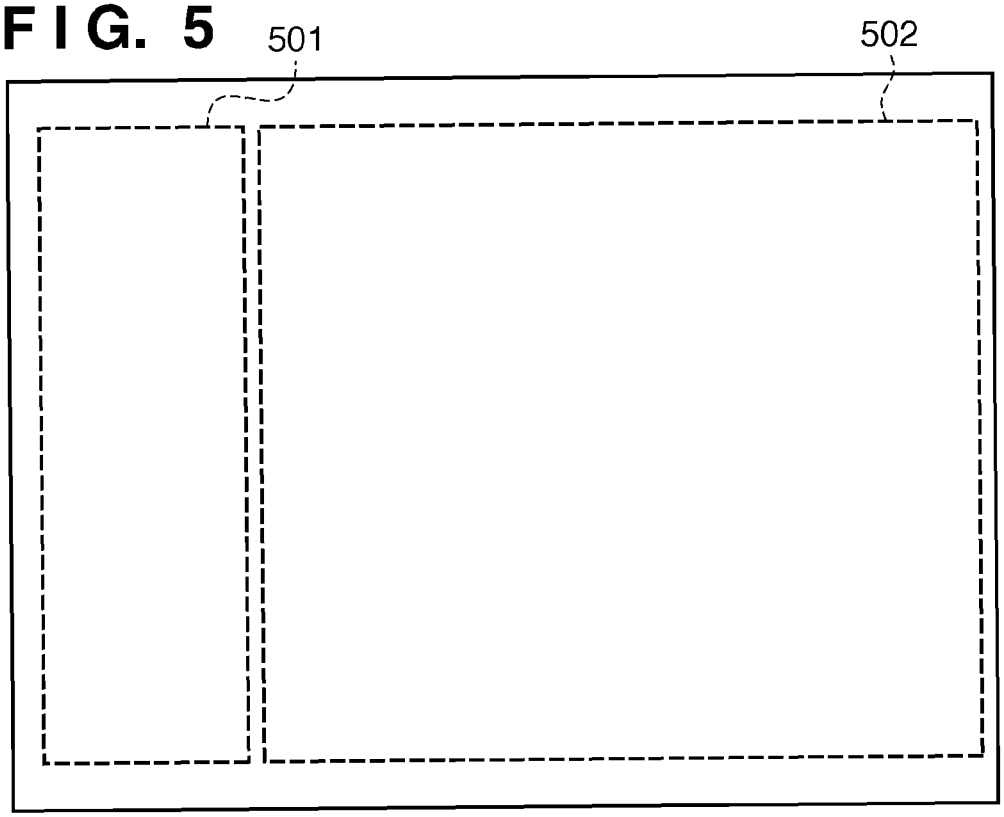
FIG. 5 illustrates the definition of areas in the display unit 105 of the computer device 201.

FIG. 5 is a schematic view showing the definition of areas in the display unit 105 of the computer device 201. A common display area 501 is for displaying operation buttons or the like. An individual display area 502 is for displaying video or the like.

The CPU 101 is able to analyze data transmitted from a camera, and perform control to display information included in the first constituent portion in the common display area of the operation window, and display information included in the second constituent portion in the individual display area of the operation window.

Figure 6:
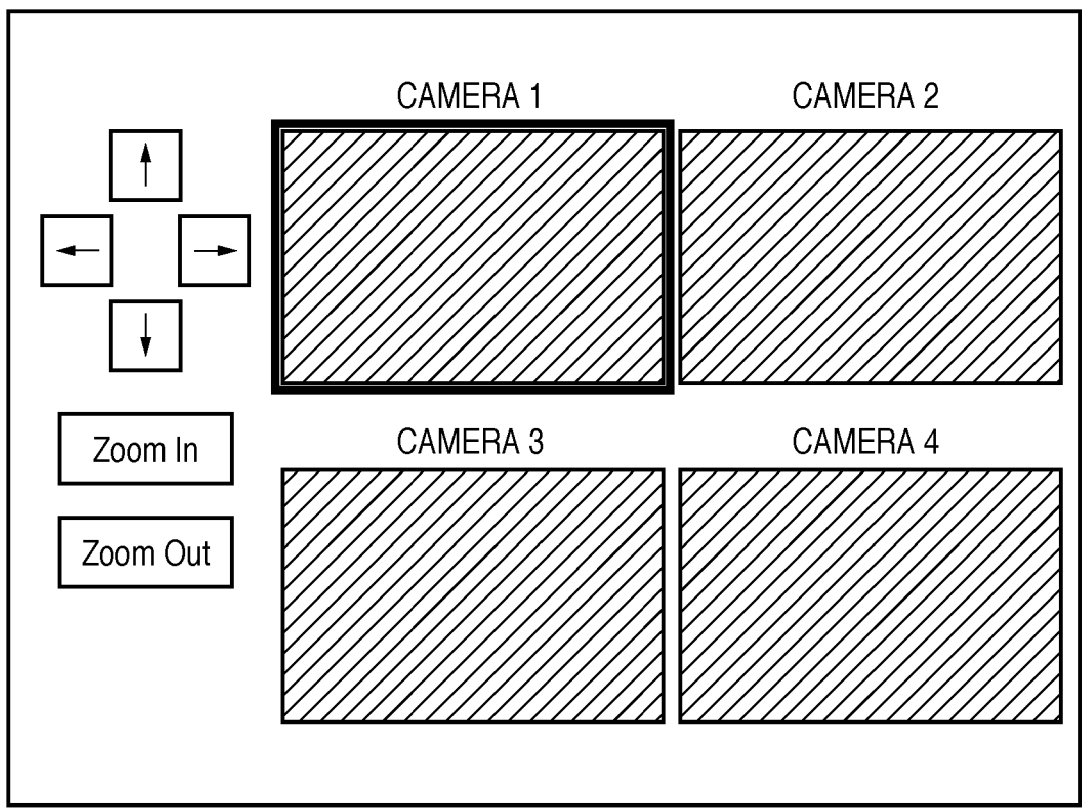
FIG. 6 illustrates a state in which XML data received from a plurality of cameras is displayed on the display unit 105 of the computer device 201.

FIG. 6 illustrates a state in which XML data received from four cameras is displayed on the display unit 105 of the computer device 201. As shown in FIG. 6, operation buttons are displayed in the common display area, similarly to FIG. 5, and video received from the four cameras is respectively displayed in the individual display area. Here, the individual display area is divided in four in order to display video from the four cameras. To display video from five or more cameras, the individual display area may be further divided, or the computer device 201 may be configured so as to be able to scroll the individual display area.

Information related to the operation buttons disposed on the left side of the window shown in FIG. 6 is provided in advance on the operation terminal side, and displayed by software implemented on the operation terminal. On the other hand, information disposed on the right side of FIG. 6 is, in the case of a surveillance camera control system, moving image information which is sent from external devices.

Figure 7:
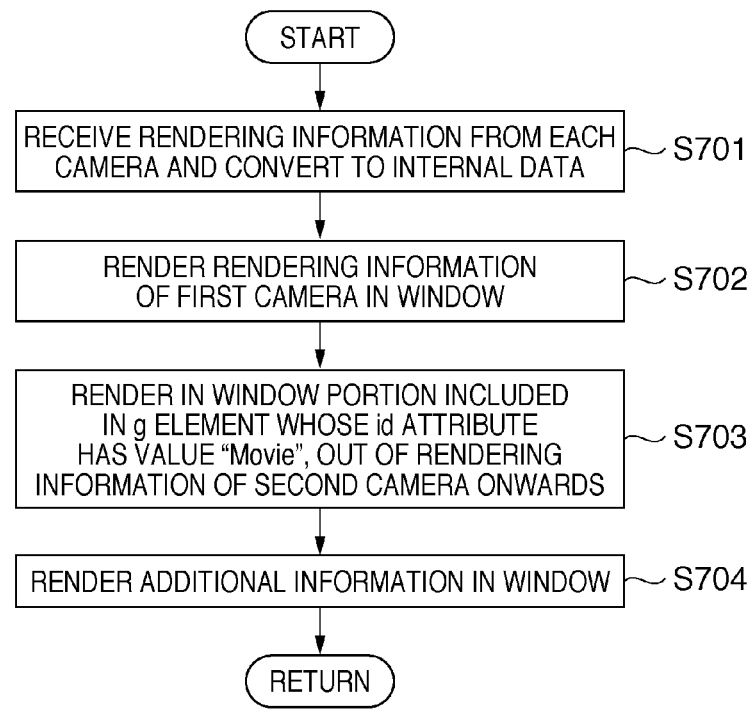
FIG. 7 is a flowchart illustrating processing when the computer device 201 performs display on the display unit 105.

FIG. 7 is a flowchart showing processing when the computer device 201 displays the window in FIG. 6 on the display unit 105. In the present embodiment, processing is performed as a result of the CPU 101 reading out and executing program code stored on the hard disk 104 of the computer device 201.

As shown in FIG. 7, firstly, in the computer device 201, respective XML data constituting rendering information is received from each camera, and this data is analyzed and converted to internal data (S701). Internal data as referred to here is data for facilitating processing performed using programs, and is, for example, data in a format in which XML elements and attributes are assigned to a structure defined by a programming language. This internal data is stored in the RAM 103 of the computer device 201. Here, received XML data is converted to internal data, although received XML data may be stored in the RAM 103 without being modified. In the processing of S701, the number of partitions in the individual display area of the display unit 105 is decided according to the number of cameras connected to the LAN 202.

In S702, XML data received from the first camera is rendered in the window. In the present embodiment, numbers are assigned in advance to the plurality of cameras with which the computer device 201 communicates, and processing is performed in that order. In the rendering process of S702, the data internalized in S701 is processed, and out of the received XML data, both information related to operation buttons and information related to video are analyzed and displayed.

Subsequently, in S703, information included in g elements whose id attribute has the value "Movie", out of the XML data received from the second camera onwards, is rendered in the individual display area. Here, information included in g elements whose id attribute has the value "Keys" is not rendered. The portion of XML data that relates to operation buttons is common to the XML data sent from the cameras, and this portion, having already been rendered at S702, is not rendered at S703. At S703, only rendering of the video portion is performed. Because four cameras are connected to the LAN 202 in the present embodiment, XML data received from the second to fourth cameras is processed sequentially at S703.

Finally, in S704, additional information other than the information contained in the received XML data is rendered and displayed on the display unit 105. The additional information rendered here refers, in the rendering example shown in FIG. 6, to the text "Camera 1", "Camera 2", "Camera 3" and "Camera 4" and to the thick-line frame provided around the video portion of camera 1. The text indicates the names of the cameras, and the thick-line frame is for showing the operator which camera is selected. This information is stored in advance in the RAM 103 of the computer device 201, and at S704 this information is rendered in predetermined positions.

The processing of S702 and S703, out of the processing shown in the flowchart of FIG. 7, involves rendering in the areas (common display area 501 and individual display area 502) shown in FIG. 5 based on the received XML data. The received XML data is SVG data, and the rendering positions of objects are described in advance as coordinate values. When rendering these objects in the common display area 501 or the individual display area 502, a coordinate transformation process is performed on the coordinate values acquired from the XML data. When displaying information related to operation buttons in the common display area 501, for example, a coordinate space with the upper left corner of the common display area 501 as the origin is presupposed, and linear transformation is performed on the coordinate values contained in the XML data to ensure that all of the operation buttons fit within the common display area 501. In particular, since SVG data consists of vector graphics, a coordinate transformation process such as this can be performed with relatively simple calculations, and the rendering quality of the operation buttons does not deteriorate when zooming in or out.

The information displayed at S704, out of the processing shown in the flowchart of FIG. 7, is stored in advance in the RAM 103 of the computer device 201. The computer device 201 is provided with software having a function of inputting the names of external devices, and a function of selecting one of the external devices. The information displayed at S704 is input by the operator using this software, and stored in the RAM 103. This software may be downloaded and executed from one of the external devices, rather than being provided in advance in the computer device 201, or may be implemented as plugin software for a web browser. This software is written in JavaScript or the like, and may be transmitted from one of the external devices together with the XML data shown in FIG. 3, and executed with the computer device.

Figure 8:
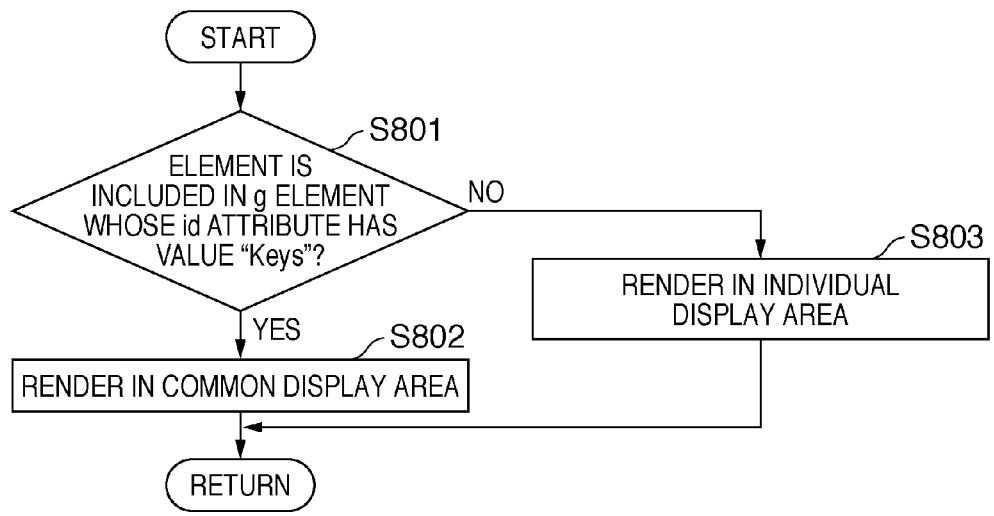
FIG. 8 is a flowchart illustrating in detail the processing of S702, out of the processing shown in the flowchart of FIG. 7.

FIG. 8 is a flowchart showing specifically the processing of S702, in particular, out of the processing shown in the flowchart of FIG. 7. This processing is executed under the control of the CPU 101. The processing shown in FIG. 8 is performed when processing the elements of the XML data in the processing of S702.

Firstly, it is judged whether the element to be rendered relates to an operation button. That is, in S801, it is judged whether the element to be rendered is included in a g element whose id attribute has the value "Keys".

If judged in S801 that the element to be rendered relates to an operation button (S801: YES), this element is rendered in the common display area in S802. If judged in S801 that the element to be rendered does not relate to an operation button (S801: NO), this element is rendered in the individual display area in S803.

The processing shown in the flowcharts of FIGS. 7 and 8 enables the window shown in FIG. 6 to be displayed on the display unit 105 of the computer device 201.

Performing display as shown in FIG. 6 enables a user friendly operation window to be realized, since operation buttons constituting the common portion can be displayed large, and video from a plurality of cameras can be viewed simultaneously.

In the case of the operator operating the computer device 201, the operator can select an operation button after having selected a desired camera window in the individual display area with a pointing device such as a mouse. The computer device 201 transmits a command corresponding to the selected operation button to the camera selected by the operator. In this case, the CPU 101 of the computer device 201 executes transmission control for transmitting information input via the operation button on the operation window to at least one of the plurality of external devices.

Such processing in response to an operation by the operator is executed by software implemented on the computer device 201. In the present embodiment, computer programs that perform such processing can, for example, be prestored on the hard disk 104 of the computer device 201. Computer programs may also be downloaded from one of the external devices and executed. Computer programs may also be implemented as plugin software for a web browser, in which case the operation windows of a plurality of external devices can be displayed without launching a plurality of web browsers.

This software is written in JavaScript or the like, and may be transmitted from one of the external devices together with the XML data shown in FIG. 3, and executed with the computer device.

In the case of JavaScript, in particular, a single JavaScript code can only generally be used to perform communication with one external device due to security restrictions. In this case, JavaScript codes executed according to an operation by the operator may be switched to allow communication with plural devices.

According to the present embodiment, an information processing technique can be provided that enables a plurality of external devices to be viewed, and is, moreover, capable of displaying individual operation windows as large as possible. That is, an information processing technique can be provided that realizes an operator-friendly user interface in a system for displaying the operation windows of a plurality of external devices.

Also, the present embodiment enables an information processing technique to be provided that prevents the same rendering process being repeated, and enables efficient rendering to be performed.

Second Embodiment

In the first embodiment, processing was described in a system premised on the content of g elements whose id attribute has the value "Keys", out of XML data sent from the cameras, all being the same. In the present embodiment, processing will be described in a system in which the content of g elements whose id attribute has the value "Keys" is different. The block diagram of FIG. 1 and the system configuration diagram of FIG. 2 are similar to the first embodiment.

FIGS. 3 and 9 show exemplary XML data transmitted to the computer device 201 from cameras (203, 204, 205, 206) connected to the LAN 202. The descriptive content related to operation buttons differs in the XML data shown in FIGS. 3 and 9. While the XML data in FIG. 3 includes information on zoom in and zoom out buttons, there are no zoom in and zoom out buttons in FIG. 9. That is, XML data such as shown in FIG. 9 is transmitted from a camera that does not have a zoom in/zoom out function, while XML data such as shown in FIG. 3 is transmitted from a camera that has a zoom in/zoom out function. In the present embodiment, cameras 1 and 2 have a zoom in/zoom out function, while cameras 3 and 4 do not have a zoom in/zoom out function.

FIGS. 6 and 11 show exemplary window displays on the display unit 105 in the present embodiment. Similarly to the first embodiment, the display unit 105 in the present embodiment can also display the common display area 501 and the individual display area 502 shown in the schematic diagram of FIG. 5.

Figure 10:
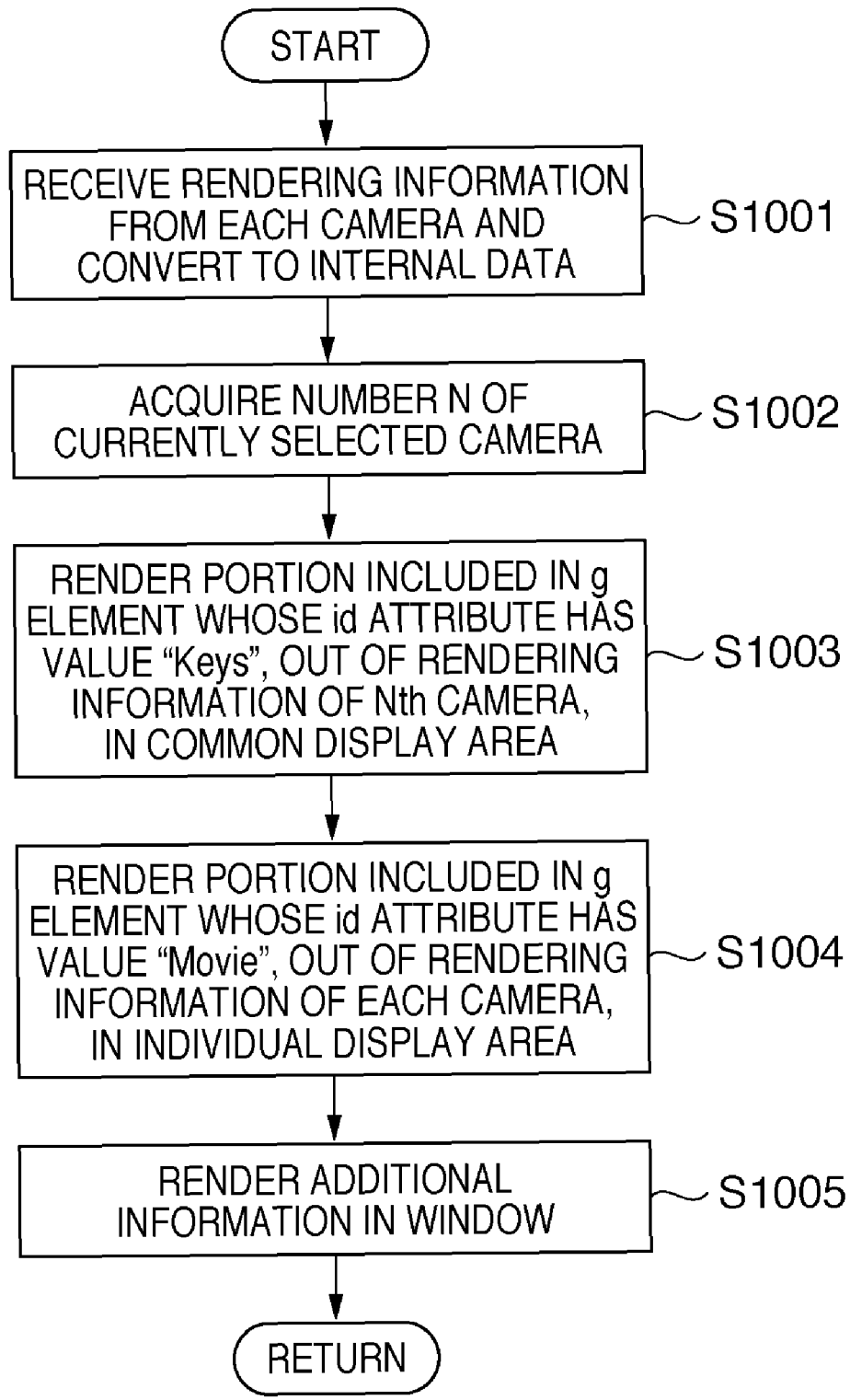
FIG. 10 is a flowchart illustrating processing when the computer device 201 performs display on the display unit 105.

FIG. 10 is a flowchart showing processing when the computer device 201 performs display on the display unit 105 in the present embodiment. This processing is performed under the control of the CPU 101. In the computer device 201, firstly, in S1001, respective XML data constituting rendering information is received from each camera, and this data is analyzed and converted to internal data.

Next, in S1002, the number N of the camera that is currently selected is acquired. The computer device 201 has internally assigned unique numbers to the cameras connected via the LAN 202 in order to manage the cameras. The computer device 201 is configured to enable the operator to select a camera via the operation unit 106, and the number of the currently selected camera is stored in the RAM 103. At S1002, the number N of the currently selected camera is read out from the RAM 103.

Subsequently, in S1003, information contained in the g element whose id attribute has the value "Keys", out of the rendering information of the Nth camera, is rendered in the common display area 501. That is, the operation buttons of the currently selected camera are rendered in the common display area 501.

Following the processing of S1003, in S1004, information contained in g elements whose id attribute has the value "Movie", out of the rendering information of the cameras, is respectively rendered in the individual display area 502. In S1005, the additional information is then rendered.

Processing performed using the above procedures enables the window shown in FIG. 6 to be displayed in the display unit 105 when camera 1 is selected, and the window shown in FIG. 11 to be displayed when camera 3 is selected, for example.

Each time the operator selects another camera via the operation unit 106, the processing shown in the flowchart in FIG. 10 is performed, and the common display area switches to the operation buttons of that camera. In this case, the CPU 101 and the operation unit 106 function as a display area selection unit adapted to select any one of the plurality of display areas displayed in the individual display area.

In the present embodiment, information related to the operation buttons of each camera is included in the XML data sent from that camera, and a display window is created by individually processing this information. Therefore, even when newly connecting a camera with operation buttons that other cameras which are already connected do not have, a display window corresponding to that camera can be configured.

The present embodiment enables an information processing technique to be provided that is capable of responding flexibly to differences in the operation methods of external devices.

Third Embodiment

In the first and second embodiments, methods of judging rendering areas using the values of id attributes in XML data sent from each camera were described. In the present embodiment, a method of performing processing without using id attributes will be described.

The block diagram of FIG. 1 and the system configuration diagram of FIG. 2 are similar to the first embodiment.

The XML data illustrated in FIGS. 3 and 9 is also transmitted to the computer device 201 from cameras 1, 2, 3 and 4 connected to the LAN 202 in the present embodiment. FIGS. 6 and 11 show exemplary window displays on the display unit 105 in the present embodiment. Similarly to the first and second embodiments, the display unit 105 in the present embodiment can also display the common display area 501 and the individual display area 502 shown in the schematic diagram of FIG. 5.

Figure 12:
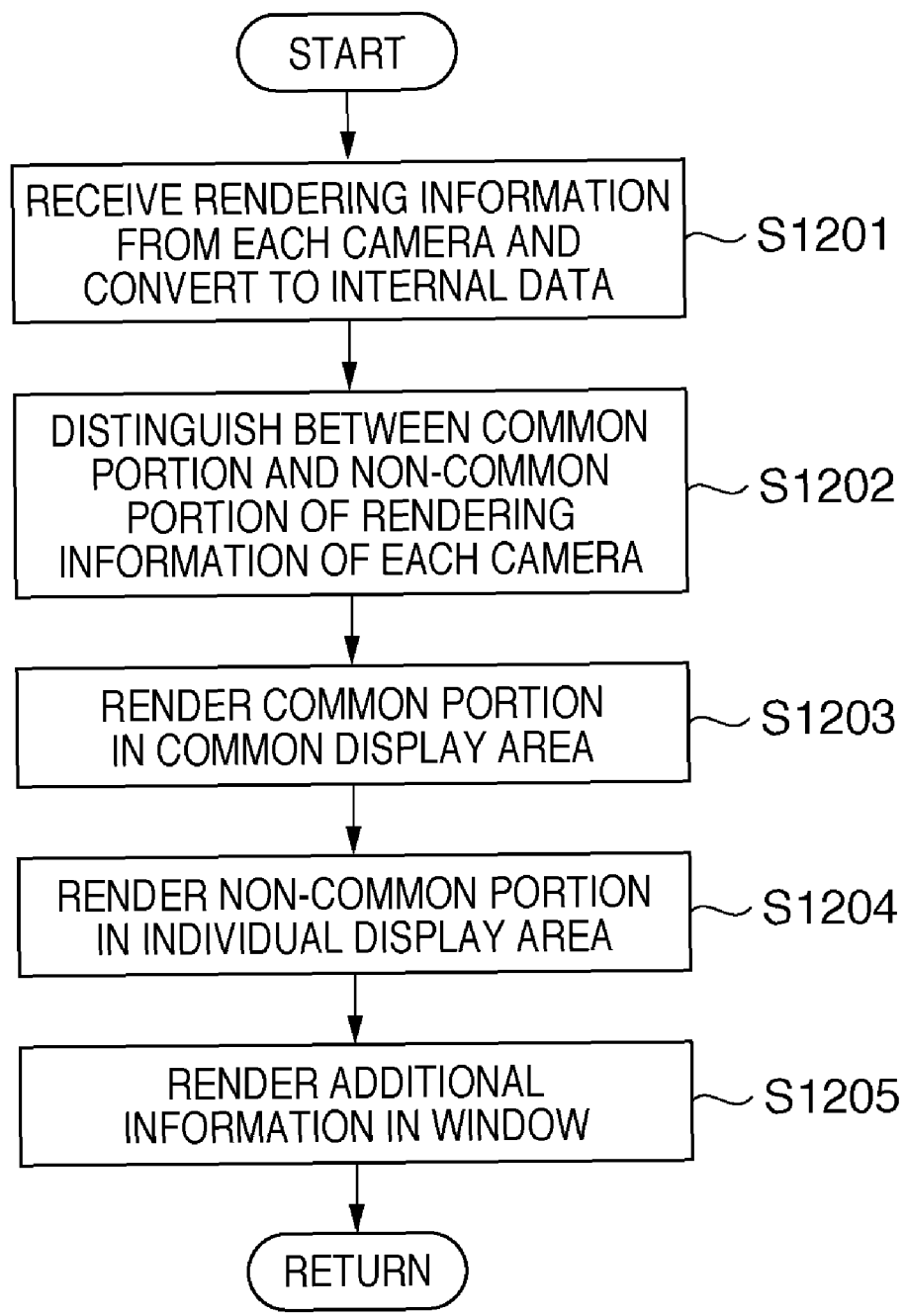
FIG. 12 is a flowchart showing processing when the computer device 201 performs display on the display unit 105.

FIG. 12 is a flowchart showing processing when the computer device 201 performs display on the display unit 105 in the present embodiment. This processing is performed under the overall control of the CPU 101.

In the computer device 201, firstly, in S1201, respective XML data constituting rendering information is received from each camera, and this data is analyzed and converted to internal data.

Next, in S1202, distinction is made between common portions and non-common portions of the rendering information of each camera. That is, the four pieces of rendering information in total received from the cameras are analyzed, and distinction is made between portions that are common to all of the rendering information and portions that are not. The judgment of common and non-common portions involves comparing the descriptions of the XML data in units of elements and judging whether they are the same. In the case of the XML data shown in FIGS. 3 and 9, descriptions related to the up/down/left/right cursors, being the same, are viewed as being common portions, whereas the remaining descriptions, not being the same, are viewed as being non-common portions.

Subsequently, in S1203, the portions judged at the previous step S1202 to be common portions are rendered in the common display area 501 of the display unit 105. In S1204, the portions judged at the previous step S1202 to be non-common portions are rendered in the individual display area 502. The non-common portions are sequentially processed and rendered, since they may be included in the respective rendering information of each camera. Finally, in S1205, the additional information is rendered, and the processing of the flowchart in FIG. 12 is ended.

Figure 13:
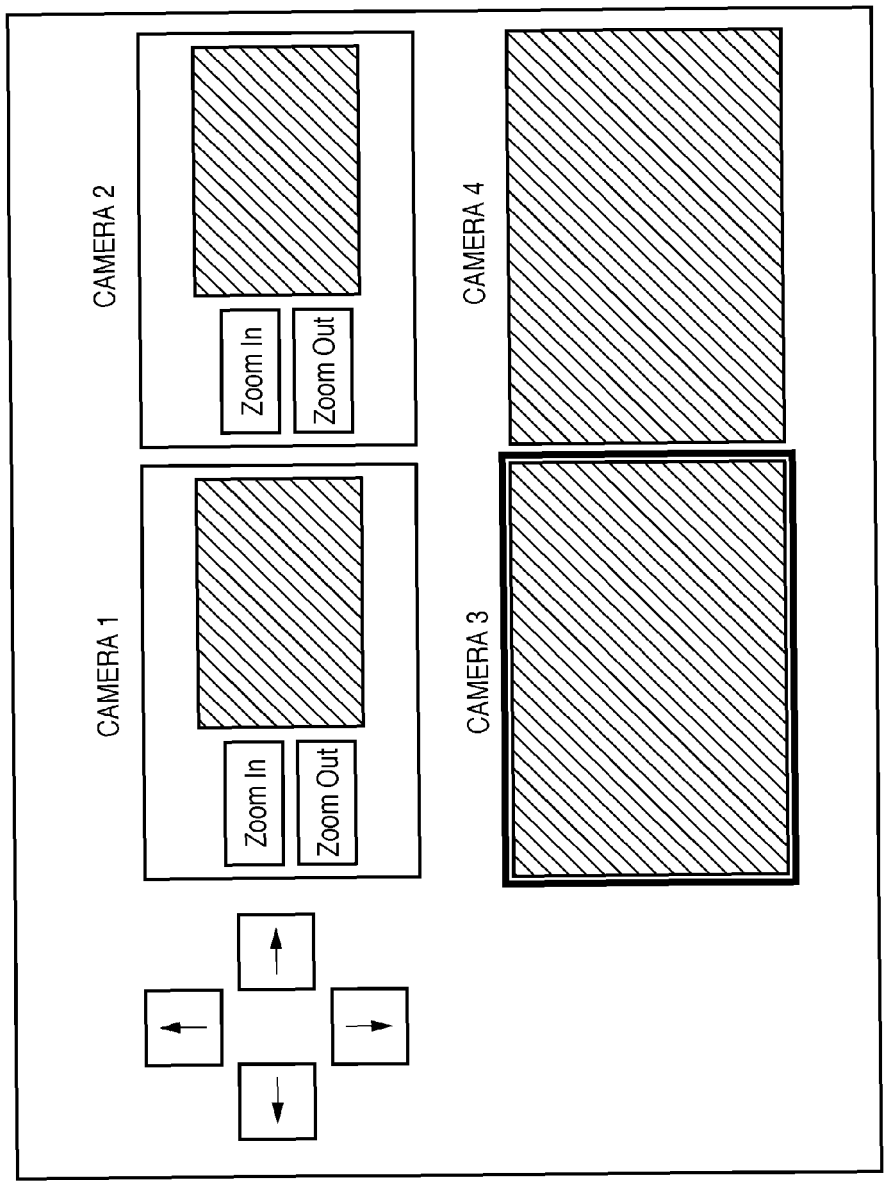
FIG. 13 illustrates a display on the display unit 105 of the computer device 201 in the case where processing is performed in accordance with the flowchart in FIG. 12.

FIG. 13 shows an exemplary display on the display unit 105 in the case where processing is performed in accordance with the flowchart in FIG. 12. In the present embodiment, since there is description of a zoom in button and a zoom out button in the rendering information of camera 1 and camera 2, these buttons are rendered in the display areas of cameras 1 and 2 in the individual display area, as shown in FIG. 13. On the other hand, since there is no description of a zoom in button or a zoom out button in the rendering information of camera 3 and camera 4, these buttons are not rendered in the display areas of cameras 3 and 4 in the individual display area. The up/down/left/right cursor buttons, being included in the rendering information of all of the cameras, are rendered in the common display area 501.

The present embodiment enables an information processing technique to be provided that is capable of responding flexibly to differences in the operation methods of external devices.

Fourth Embodiment

In the first to third embodiments, examples where shown in which mainly operation buttons were displayed in the common display area, and mainly video information was displayed in the individual display area. In the present embodiment, an example will be shown in which operation buttons are displayed in the individual display area, and video information is displayed in the common display area. The block diagram of FIG. 1 and the system configuration diagram of FIG. 2 are similar to the first embodiment.

The XML data illustrated in FIGS. 3 and 9 is also transmitted to the computer device 201 from cameras 1, 2, 3 and 4 connected to the LAN 202 in the present embodiment.

In the present embodiment, the display unit 105 can display the areas shown in the schematic diagram of FIG. 5, although different from the first to third embodiments, the area shown by the broken line 501 in FIG. 5 functions as an individual display area, and the area shown by the broken line 502 in FIG. 5 functions as a common display area.

In the present embodiment, similarly to the first and second embodiments, the computer device 201 judges whether to render in the common display area or render in the individual display area, using the id attributes of the XML data. In the first and second embodiments, examples were described in which the content of g elements whose id attribute has the value "Keys" was rendered in the common display area. In the present embodiment, a configuration will be described in which the content of g elements whose id attribute has the value "Keys" is rendered in the individual display area, and the content of g elements whose id attribute has the value "Movie" is rendered in the common display area.

Figure 14:
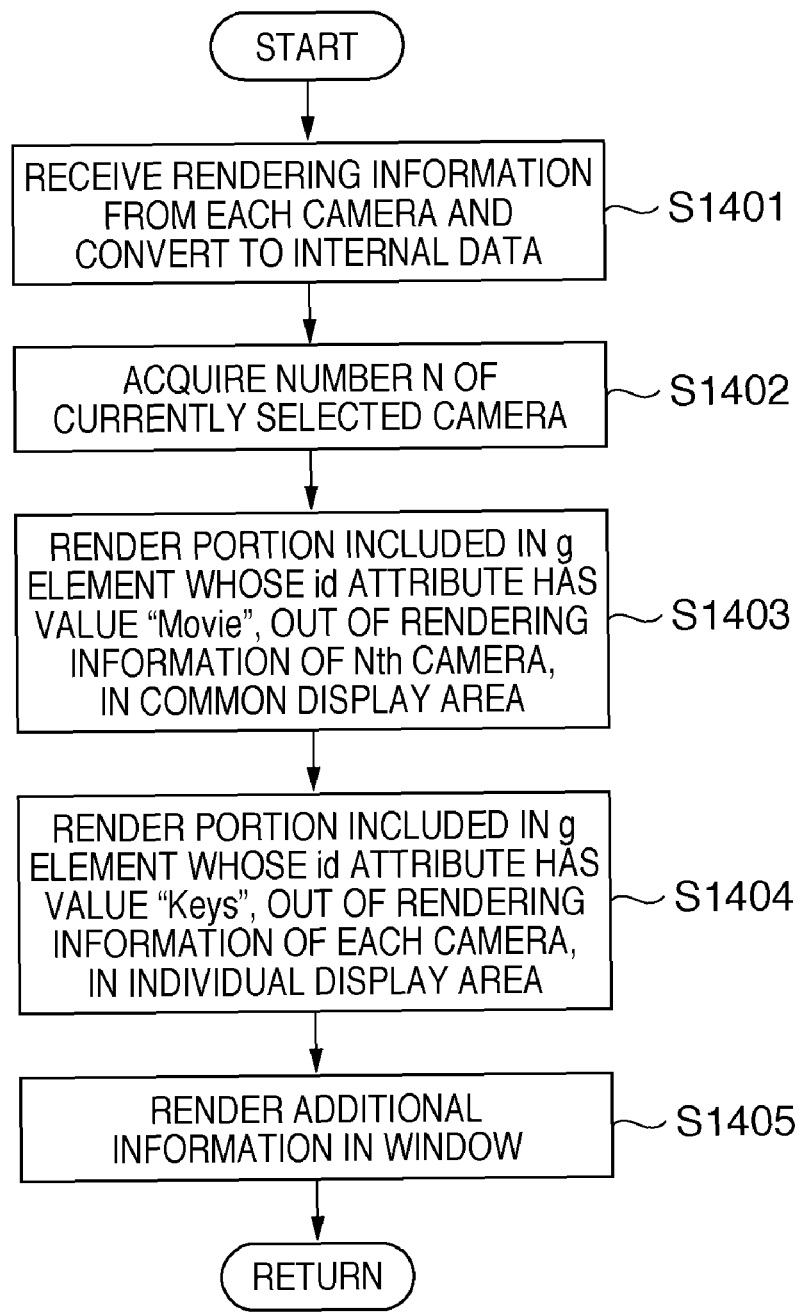
FIG. 14 is a flowchart illustrating processing when the computer device 201 performs display on the display unit 105.

FIG. 14 is a flowchart showing processing when the computer device 201 performs display on the display unit 105 in the present embodiment. This processing is executed under the overall control of the CPU 101.

While the processing flow shown in the FIG. 14 flowchart is substantially the same as the flow of the FIG. 10 flowchart shown in the second embodiment, the values of the id attributes processed in S1403 and S1404 are different.

Since S1401, S1402 and S1405 are respectively the same as S1001, S1002 and S1005, description thereof will be omitted.

At S1403, information contained in the g element whose id attribute has the value "Movie", out of the rendering information of the Nth camera, is rendered in an area 1502 (FIG. 15) that functions as a common display area. That is, the video information of the currently selected camera is rendered in an area 1502 (FIG. 15) that functions as a common display area.

Information contained in the g element whose id attribute has the value "Keys", out of the rendering information of each camera, is then rendered in an area 1501 (FIG. 15) that functions as an individual display area (S1404).

Figure 15:
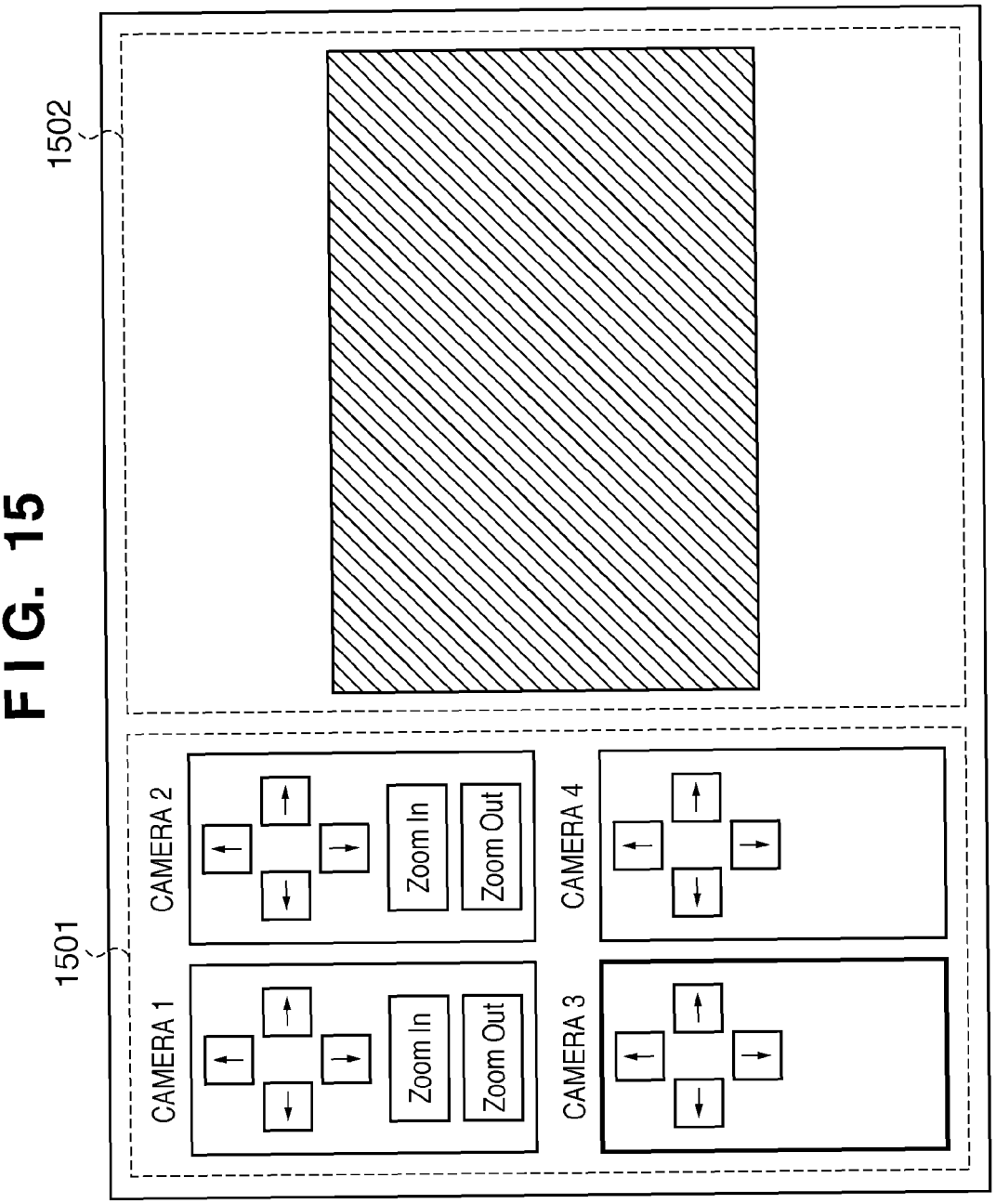
FIG. 15 illustrates a display on the display unit 105 in the case where processing is performed in accordance with the flowchart in FIG. 14.
Figure 16:
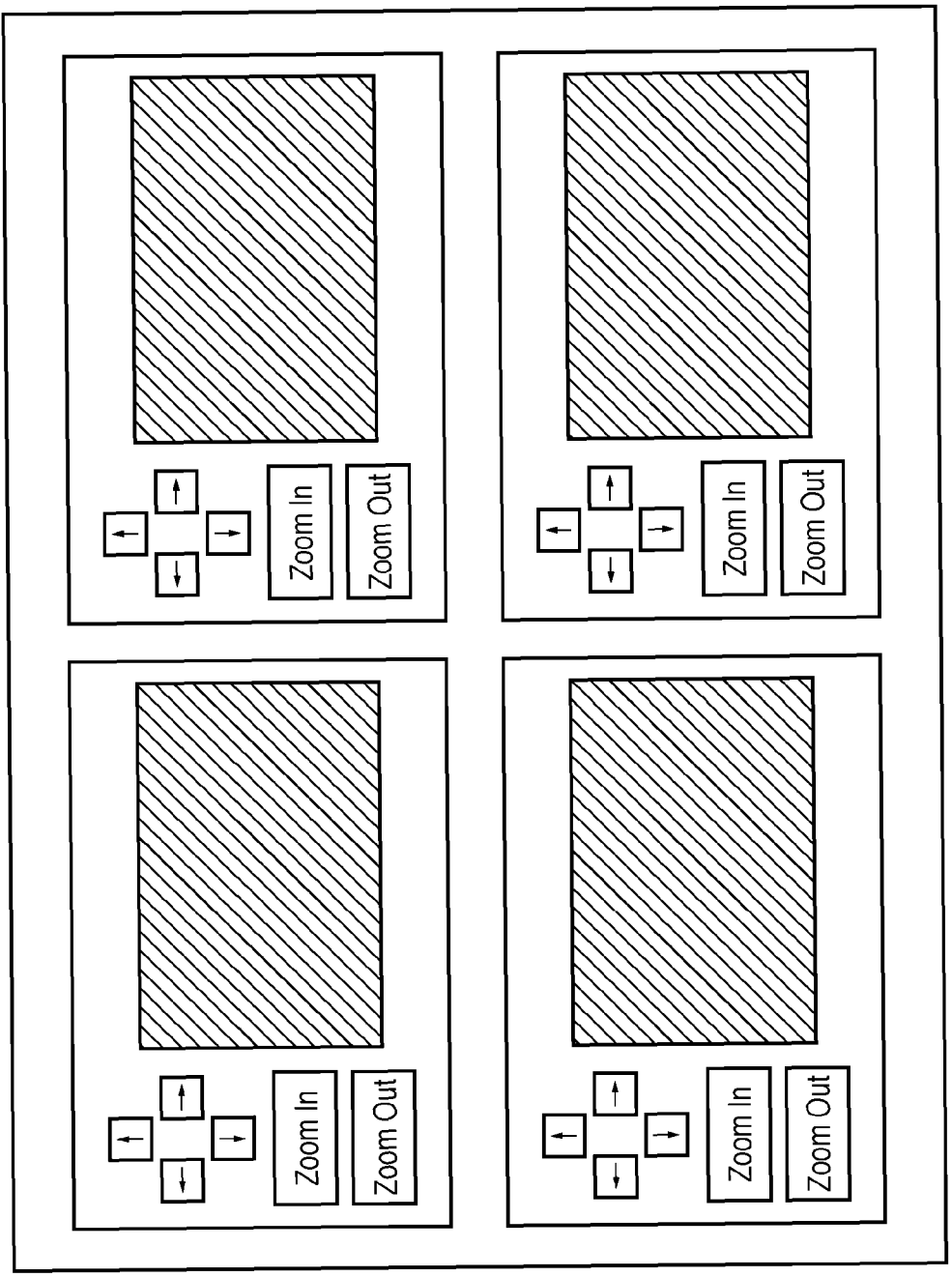
FIG. 16 shows an example in which the operation windows of external devices are displayed by launching a plurality of web browsers on a PC.
Figure 17:
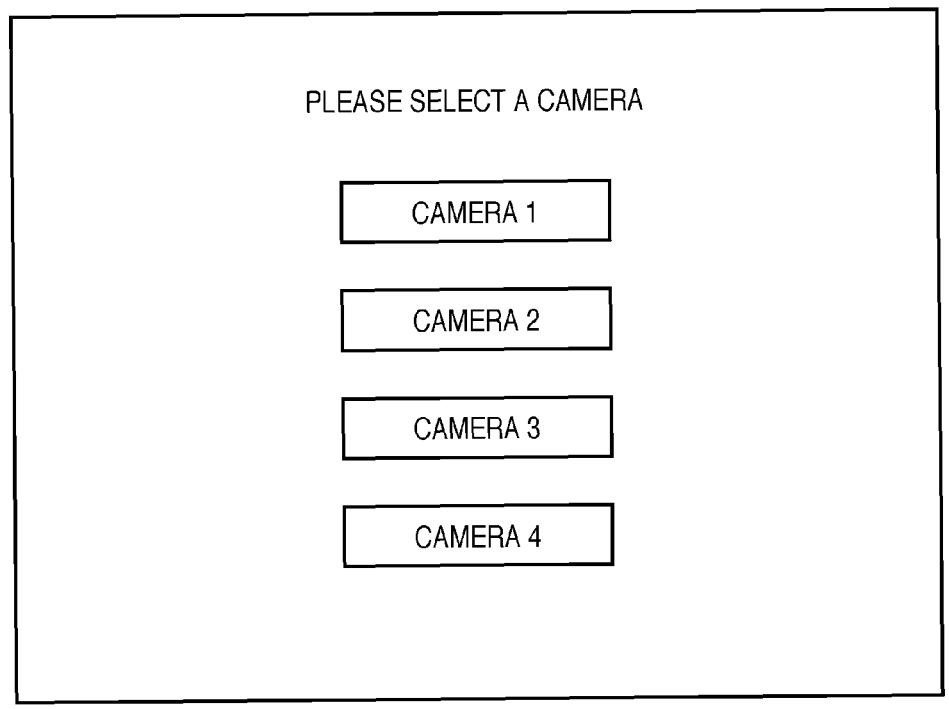
FIG. 17 illustrates an external device selection window.

FIG. 15 shows an exemplary display on the display unit 105 in the case where processing is performed in accordance with the flowchart in FIG. 14. As shown in FIG. 15, the area 1501 functioning as an individual display area on the left of the window has been divided according to the number of cameras, and the operation buttons of the individual cameras are displayed. Displayed in the area 1502 functioning as a common display area on the right of the window is video sent from the currently selected camera.

With the window in FIG. 15, the processing shown in the FIG. 14 flowchart is again performed when the operator selects another camera via the operation unit 106, and the common display area switches to video from that camera.

With the method of the present embodiment, the video display portion can be enlarged, enabling the visibility of the video to be improved. Another advantage is that since the operation panels of connected external devices can be viewed, the operator can easily grasp what functions the external devices have.

Fifth Embodiment

In the first to fourth embodiments, examples were shown concerning mainly the display method and the display processing. In the present embodiment, exemplary processing will be shown in the case where an operation by an operator is performed in a device that performs the display method shown in the first embodiment or the third embodiment.

The block diagram of FIG. 1 and the system configuration diagram of FIG. 2 are similar to the first embodiment.

The XML data illustrated in FIGS. 3 and 9 is also transmitted to the computer device 201 from cameras (203, 204, 205, 206) connected to the LAN 202 in the present embodiment.

Figure 18:
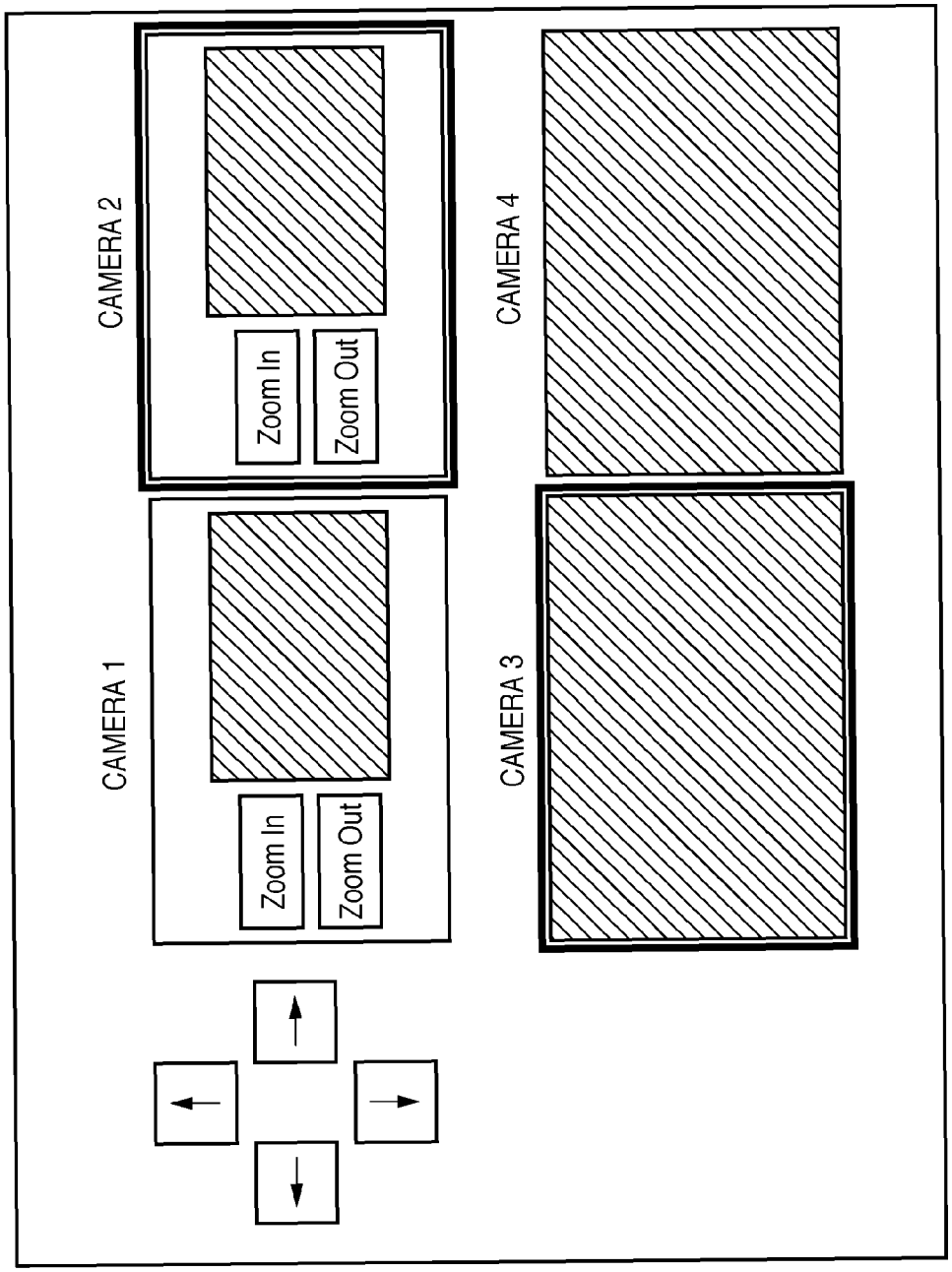
FIG. 18 shows an exemplary display on the display unit 105 of the computer device 201.

FIG. 18 is an example showing a display state on the display unit 105 when a plurality of cameras have been selected. As shown in FIG. 18, a thick-line frame is displayed around the video portions of cameras 2 and 3, enabling the operator to perceive the selection state.

In the present embodiment, one or a plurality of cameras can be selected using a pointing device such as a mouse. If the operator operates a button in the common display area, a command corresponding to that button is transmitted to a selected camera, and the camera that receives the command performs an operation in accordance with the command. If the operator performs the button operation in the common display area with a plurality of cameras in the selected state, the command is transmitted to all of the selected cameras.

FIG. 19 is a flowchart showing processing performed by the device when the operator performs a button operation in the common display area.

As shown in FIG. 19, if the operator performs an operation on a button in the common display area, firstly, a list of camera windows in the individual display area that are in the selected state is acquired (S1701). This list is for internal management, and if cameras 2 and 3, for example, are selected, an ID number showing camera 2 is stored in the 0th number in the list, and an ID number showing camera 3 is stored in the 1st number in the list. Only the 0th and 1st numbers will exist in the list if two cameras have been selected. That is, the 2nd number down will not exist in the list.

After the processing of S1701, a variable N showing an index number in the list is set to 0 (S1702).

Next, it is judged whether the Nth number exists in the list acquired at S1701 (S1703). If judged in S1703 that the Nth number exists in the list, a command is transmitted to the camera corresponding to the ID number stored in the Nth number in the list (S1704). The command transmitted here corresponds to the button operated by the operator. A configuration is also possible in which the type of command or the transmission method is changed according to the camera to which the command will be transmitted.

After the processing of S1704, 1 is added to the variable N (S1705), and the processing returns to S1703.

If judged in S1703 that the Nth number does not exist in the list, the processing is ended.

As described above, using the method shown in the present embodiment enables a command to be transmitted with a single operation to a plurality of external devices having the same button, thereby improving operator-friendliness.

Five embodiments have been described above, although a method that is provided with all of these embodiments and that switches the processing configuration according to the situation may be used. In the five embodiments, a configuration was described in which the display unit 105 was divided into two areas as shown in FIG. 5, although there may be more than two areas. For example, the display unit 105 may be divided into a total of three areas, consisting of one common display area and two individual display areas. In the case of there being a plurality of individual display areas, for example, the computer device 201 judges which individual display area in which to perform display, based on the values of id attributes or the like.

While a system for remotely operating networked cameras was described as an example in these embodiments, the intent of the present invention is not, needless to say, limited to a camera. The present invention is applicable to a remote operation system for any kind of device that can be connected to a network, such as a printer, router, scanner, copier, facsimile machine or the like, for example. Further, "remote operation" covers not only moving an external device mechanically, but also changing the setting information of a software program included in an external device, for instance.

The objects of the present invention can also be achieved by supplying a storage medium with a computer program for realizing the functions of the foregoing embodiments recorded thereon to a system or a device. Needless to say, the objects of the present invention are also achieved by a computer (or CPU or MPU) in the system or device reading out and executing the computer program stored in the storage medium. In this case, the actual computer program read out from the computer-readable storage medium realizes the functions of the foregoing embodiments, and the computer-readable storage medium storing the computer program constitutes the present invention.

Storage media that can be used for supplying the program include, for example, flexible disk, hard disk, optical disk, and magneto-optical disk. Further, CD-ROM, CD-R, magnetic tape, nonvolatile memory card, ROM, DVD and the like can also be used as storage media.

The functions of the foregoing embodiments are realized as a result of a computer executing the read computer program. Also, an operating system (OS) or the like running on a computer may execute part or all of the actual processing, based on instructions in the computer program. Needless to say, the case where the functions of the foregoing embodiments are realized by this processing is also covered by the embodiments.

Further, the computer program read out from the storage medium may be written to a memory provided in a function expansion board inserted in a computer or a function expansion unit connected to a computer. Then, a CPU or the like provided in the function expansion board or the function expansion unit may perform part or all of the actual processing, based on instructions in the computer program. Needless to say, the case where the functions of the foregoing embodiments are realized by this processing is also covered by the embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-242907, filed Sep. 19, 2007 and Japanese Patent Application No. 2008-217325, filed Aug. 26, 2008, which are hereby incorporated by reference herein in their entirety.

What is claimed is:

1. An information processing apparatus that is configured to receive data from a plurality of external devices connected via a network, and to display an operation window based on a content of the data, said information processing apparatus comprising:
a reception unit configured to receive a plurality of pieces of operation information transmitted from the plurality of external devices, wherein each of the plurality of pieces of operation information includes information related to an operation button for remotely operating a transmission source external device using the operation window;
a distinction unit configured to distinguish whether a type of information included in the plurality of pieces of operation information received by said reception unit is common operation information or non-common operation information; and
a display unit configured to (i) display, at a common display area of the operation window, one rendered image corresponding to the common operation information, and to (ii) display, at an individual display area of the operation window, a rendered image corresponding to the non-common operation information,
wherein if information rendering a first operation button is received from respective ones of the plurality of external devices, but information rendering a second operation button is not received from at least one of the plurality of external devices, then the distinction unit distinguishes the information rendering the first operation button as being common operation information, and distinguishes the information rendering the second operation button as being non-common operation information.

2. The information processing apparatus according to claim 1, wherein the data is XML data, and the data contains predetermined identification information describing an attribute of the XML data.

3. The information processing apparatus according to claim 1, further comprising a transmission unit configured to transmit, to at least one of the plurality of external devices, information input via the operation button of the operation window.

4. The information processing apparatus according to claim 3, wherein the individual display area of the operation window has a display area for displaying an image transmitted from each of the plurality of external devices.

5. The information processing apparatus according to claim 4, further comprising a display area selection unit configured to select any one of a plurality of display areas displayed in the individual display area.

6. The information processing apparatus according to claim 5, wherein said transmission unit is configured to transmit information input via the operation button to the external device corresponding to the display area selected by said display area selection unit.

7. The information processing apparatus according to claim 1, wherein the type of information being distinguished by the distinction unit is rendering information for rendering an operation button for remotely operating a transmission source external device, and
wherein the rendering information is distinguished as common operation information in response to the distinction unit distinguishing identical rendering information to be present in a plurality of the pieces of operation information.

8. The information processing apparatus according to claim 7, wherein the rendering information comprises Scalable Vector Graphics rendering information for rendering the operation button.

9. The information processing apparatus according to claim 1, wherein when the reception unit receives, from a first external device of the plurality of external devices, first information rendering an operation button, and receives, from a second external device of the plurality of external devices, second information rendering an operation button, then the distinction unit distinguishes the first information and second information to be common operation information if they are the same and to be non-common operation information if they are not the same.

10. The information processing apparatus according to claim 1, wherein if identical information rendering up, down, left, and right buttons is received from two of the plurality of external devices, then the distinction unit distinguishes the information as being common operation information.

11. The information processing apparatus according to claim 1, wherein if identical information rendering up, down, left, and right buttons is received from two of the plurality of external devices, but information rendering a zooming button is received from only one of the two external devices, then the distinction unit distinguishes the information rendering up, down, left, and right buttons as being common operation information, and distinguishes the information rendering a zooming button as being non-common operation information.

12. The information processing apparatus according to claim 1, wherein the plurality of external devices are cameras.

13. The information processing apparatus according to claim 12, wherein the plurality of external devices are video cameras.

14. The information processing apparatus according to claim 1, wherein the type of information being distinguished by the distinction unit is graphical rendering information for graphically rendering an operation button for remotely operating a transmission source external device.

15. The information processing apparatus according to claim 1, wherein the type of information being distinguished by the distinction unit is XML information.

16. The information processing apparatus according to claim 1, wherein the plurality of external devices are cameras, and
wherein the type of information being distinguished by the distinction unit is graphical rendering information for graphically rendering an operation button for remotely operating a transmission source external device.

17. The information processing apparatus according to claim 16, wherein the graphical rendering information comprises XML information.

18. The information processing apparatus according to claim 16, wherein the cameras are video cameras.

19. The information processing apparatus according to claim 1, wherein the plurality of pieces of operation information are XML data or graphical rendering information.

20. The information processing apparatus according to claim 1, wherein each of the plurality of external devices is an apparatus having an image capturing unit.

21. A control method of an information processing apparatus that is configured to receive data from a plurality of external devices connected via a network, and to display an operation window based on a content of the data, said method comprising:
a reception step of receiving a plurality of pieces of operation information transmitted from the plurality of external devices, wherein each of the plurality of pieces of operation information includes information related to an operation button for remotely operating a transmission source external device using the operation window;
a distinction step of distinguishing whether a type of information included in the plurality of pieces of operation information received in the reception step is common operation information or non-common operation information; and
a display step of (i) displaying, at a common display area of the operation window, one rendered image corresponding to the common operation information, and (ii) displaying, at an individual display area of the operation window, a rendered image corresponding to the non-common operation information,
wherein if information rendering a first operation button is received from respective ones of the plurality of external devices, but information rendering a second operation button is not received from at least one of the plurality of external devices, then the distinction step distinguishes the information rendering the first operation button as being common operation information, and distinguishes the information rendering the second operation button as being non-common operation information.

22. The control method according to claim 21, wherein the data is XML data, and the data contains predetermined identification information describing an attribute of the XML data.

23. The control method according to claim 21, further comprising a transmission step of transmitting, to at least one of the plurality of external devices, information input via the operation button of the operation window.

24. The control method according to claim 23, wherein the individual display area of the operation window has a display area for displaying an image transmitted from each of the plurality of external devices.

25. The control method according to claim 24, further comprising a display area selection step of selecting any one of a plurality of display areas displayed in the individual display area.

26. The control method according to claim 25, wherein in said transmission step, information input via the operation button is transmitted to the external device corresponding to the display area selected in said display area selection step.

27. A computer program, stored in a computer-readable storage medium, for causing a computer to execute a control method of an information processing apparatus defined in claim 21.

28. A computer-readable storage medium storing a computer program defined in claim 27.

29. The control method according to claim 21, wherein the plurality of pieces of operation information are XML data or graphical rendering information.

30. The control method according to claim 21, wherein each of the plurality of external devices is an apparatus having an image capturing unit.

* * * * *